US009762316B2

United States Patent
Kukulski et al.

(10) Patent No.: US 9,762,316 B2
(45) Date of Patent: Sep. 12, 2017

(54) LIGHTWEIGHT PAIRING AND CONNECTION TRANSFER PROTOCOL VIA GESTURE-DRIVEN SHARED SECRETS

(71) Applicant: ADOBE SYSTEMS INCORPORATED, San Jose, CA (US)

(72) Inventors: Timothy W. Kukulski, Oakland, CA (US); Geoffrey Charles Dowd, San Francisco, CA (US); Yaniv De Ridder, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/476,329

(22) Filed: Sep. 3, 2014

(65) Prior Publication Data

US 2016/0065301 A1    Mar. 3, 2016

(51) Int. Cl.
*H04B 7/26* (2006.01)
*H04W 4/00* (2009.01)
*H04W 12/08* (2009.01)

(52) U.S. Cl.
CPC .............. *H04B 7/26* (2013.01); *H04W 4/008* (2013.01); *H04W 12/08* (2013.01)

(58) Field of Classification Search
CPC ...................................................... H04W 4/008
See application file for complete search history.

(56) References Cited

U.S. PATENT DOCUMENTS

| 2004/0215815 | A1* | 10/2004 | Rekimoto | H04L 67/14 709/236 |
| 2015/0050879 | A1* | 2/2015 | MacDuff et al. | 455/39 |
| 2015/0363035 | A1* | 12/2015 | Hinckley | G06F 3/0383 345/173 |

* cited by examiner

Primary Examiner — Hsin-Chun Liao
(74) Attorney, Agent, or Firm — Shook, Hardy & Bacon, L.L.P.

(57) ABSTRACT

A gesture is performed by a wireless accessory attempting to pair with a device. The gesture comprises a series of user interactions associated with accessory data detected at the accessory and device data detected at the device. The device begins looking for accessories advertising a Bluetooth service indicating they are attempting to pair. Once an accessory is identified, the device compares the device data to the accessory data for that particular accessory. If the accessory data matches the device data, the gesture detected at the device was made by the accessory and a secure connection can be established. Based on the secure connection, a clock associated with the accessory may synchronize with a clock associated with the device for additional security and fidelity.

19 Claims, 4 Drawing Sheets

LIGHTWEIGHT PAIRING AND CONNECTION TRANSFER PROTOCOL VIA GESTURE-DRIVEN SHARED SECRETS

BACKGROUND

Currently, pairing a Bluetooth low energy (LE) accessory device requires explicit and time-consuming user interaction with both a host application or device and the Bluetooth LE accessory device. Often, the pairing procedure is not secure and relies on the limited range of Bluetooth LE and very course timing information. If the Bluetooth LE accessory device already has an active connection with another device, the Bluetooth LE accessory device is not available to pair with a new device. Instead, a user wishing to use the Bluetooth LE accessory device with the new device must either physically reset the Bluetooth LE Accessory device or explicitly close the active connection on the first device.

SUMMARY

This summary is provided to introduce a selection of concepts in a simplified form that are further described below in the Detailed Description. This summary is not intended to identify key features or essential features of the claimed subject matter, nor should it be used as an aid in determining the scope of the claimed subject matter.

Embodiments of the present invention relate to establishing and handing off secure connections between a wireless accessory and one or more devices. Generally, to do so, data associated with a gesture that is detected by an accessory of a device (accessory data) and data associated with a gesture that is detected by the device itself (device data) are compared to one another. The device may scan for accessories in Bluetooth range attempting to pair with a device and reference the accessory data to determine if that is the accessory associated with the gesture detected by the device. When the data detected by the device and the data detected by the accessory match or otherwise correspond with one another, the gesture provided in connection with the accessory can be deemed the same gesture detected by the device. In such a case, the device can provide the device data to the accessory such that the accessory can confirm a rogue device is not attempting to pair with the accessory. As a result, a secure connection between the accessory and the device is established. The device data and the accessory data may further be utilized to synchronize clocks associated with the device and accessory increasing security of the gesture and fidelity between the accessory and the device.

BRIEF DESCRIPTION OF THE DRAWINGS

The present invention is described in detail below with reference to the attached drawing figures, wherein.

DETAILED DESCRIPTION

Figure 1:
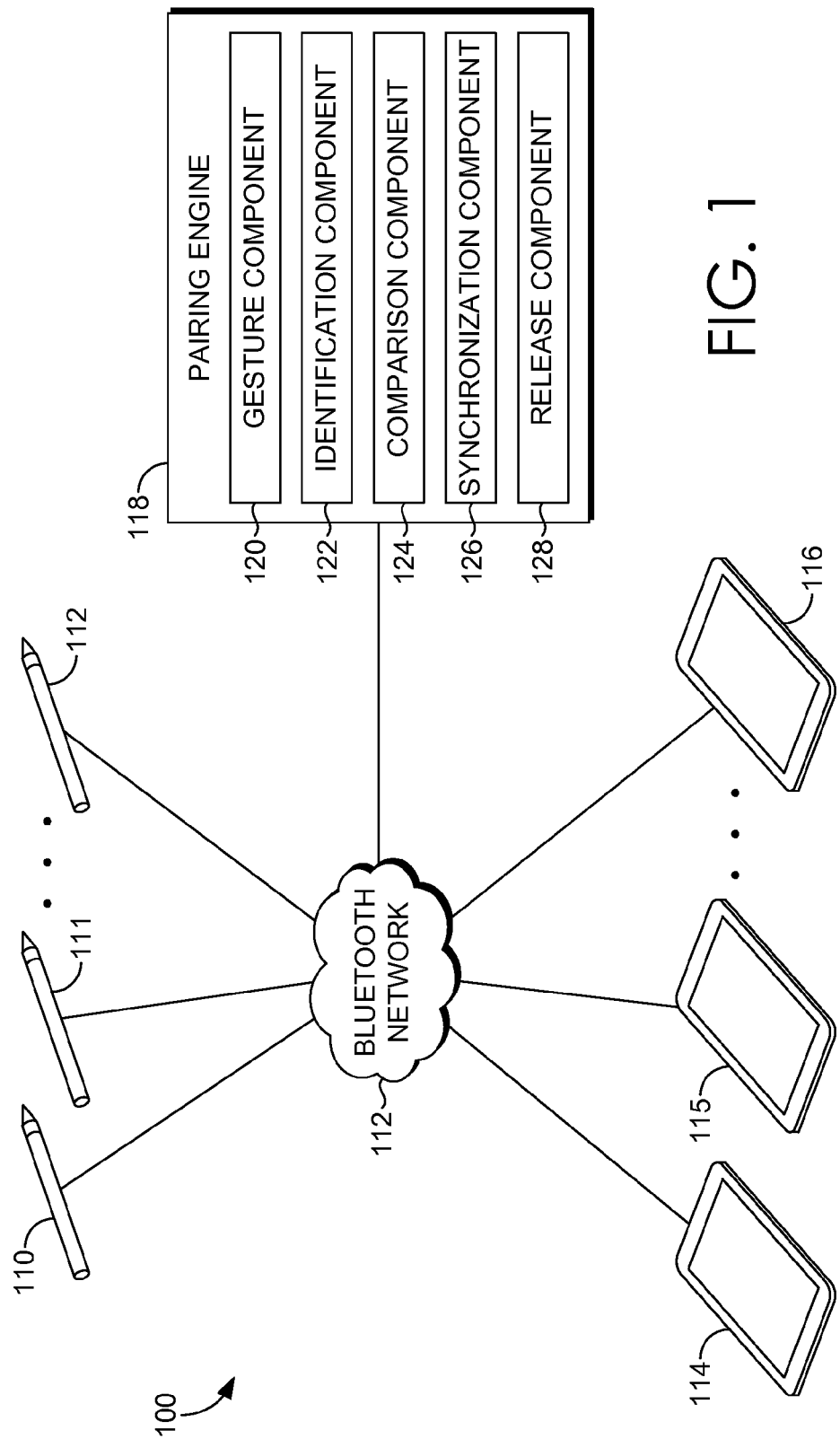
FIG. 1 is a block diagram showing a system for establishing secure connections between a wireless accessory and one or more devices in accordance with an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As noted in the Background, current systems have been developed to pair wireless accessories with devices. However, these systems require manual user interaction with either the wireless accessory or the device to establish or close a connection. This manual interaction often requires cumbersome setup dialogs within supporting applications. Further, these systems do not provide resistance to accidental and/or nefarious connection attempts, accidental misconnections, or time synchronization between the accessory and the device.

Embodiments of the present invention are generally directed to establishing and handing off secure connections between a wireless accessory and one or more devices. A gesture facilitates secure pairing between the accessory (e.g., wireless stylus) and the device (e.g., a tablet). For clarity, a gesture may be any series of one or more user interactions interpreted as having meaning (e.g., a long tap, a series of taps, a pattern of taps, a signal, and the like). The gesture is associated with accessory data and device data corresponding to measurements associated with the series of user interactions (e.g., time information, pressure data, resistance data, accelerometer data, emitter data, camera data, and the like). Upon detecting the device data indicating that a gesture has been performed, the device begins looking for an accessory attempting to pair with the device, such as by identifying an accessory advertising a Bluetooth service indicating the accessory is attempting to pair with the device (e.g., the communication class shared-secret pairing). The device obtains the accessory data from the accessory and compares the accessory data to the device data. Based on the accessory data corresponding with the device data, a secure connection is established between the accessory and the device. For additional security, the device data may be communicated to or otherwise obtained by the accessory. Clocks between the accessory and the device may be synchronized by calculating a precise clock offset between measurements associated with the gesture. Such time synchronization provides increased security of the gesture as well as increased fidelity between the accessory and the device.

Referring now to FIG. 1, a block diagram is provided that illustrates a pairing system 100 for establishing secure connections between a wireless accessory and one or more devices in accordance with an embodiment of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory. The pairing system 100 may be implemented via any type of computing device, such as computing device 600 described below with reference to FIG. 6, for example. In various embodiments, the pairing system 100 may be implemented via a single device or multiple devices cooperating in a distributed environment.

The pairing system 100 generally operates to establish and hand off secure connections between a wireless accessory and one or more devices. Among other components not shown, the system 100 may include one or more accessories 110, 111, 112, one or more devices 114, 115, 116, and a pairing engine 118. It should be understood that the system 100 shown in FIG. 1 is an example of one suitable computing system architecture. Each of the components shown in FIG. 1 may be implemented via any type of computing device, such as computing device 600 described with reference to FIG. 6, for example. The components may communicate with each other via a network 112, which may include, without limitation, one or more local area networks (LANs) and/or wide area networks (WANs). Such networking environments are commonplace in offices, enterprise-wide computer networks, intranets, and the Internet.

It should be understood that any number of accessories, devices, and pairing engines may be employed within the system 100 within the scope of the present invention. Each may comprise a single component or multiple components cooperating in a distributed environment. For instance, the pairing engine 118 may be provided via multiple components arranged in a distributed environment that collectively provide the functionality described herein. In another instance, the pairing engine 118 and functionality of one or more of the other components that comprise the pairing system 100 may be provided via a single component, such as by one of the accessories 110, 111, 112 or one of the devices 114, 115, 116 or a combination of devices such as by one of the accessories 110, 111, 112 and one of the devices 114, 115, 116. For example, the pairing engine 118 may be implemented at device 114. Additionally, other components not shown may also be included within the network environment.

As shown in FIG. 1, the pairing system 100 includes a pairing engine 118 that provides secure pairing between an accessory 110, 111, 112 and one or more devices 114, 115, 116. The pairing engine 118 includes, among other things not shown, a gesture component 120, an identification component 122, a comparison component 124, a synchronization component 126, and a release component 128.

Gesture component 120 receives, obtains, or detects an indication a gesture has been performed by an accessory. The indication may include communication of the gesture via a Bluetooth network. The accessory may include a Bluetooth LE device, such as a stylus. The gesture may comprise any series of user interactions interpreted as having meaning. For example, the gesture may include a long tap, a series of taps, a pattern of taps, a signal, and the like. In another example, the gesture may include communicating a signal, such as via an LED or emitter associated with the accessory. Based on performance of the gesture, data indicating or otherwise associated with the gesture may be detected. In this regard, an accessory can detect data associated with a gesture, which may be referred to herein as accessory data. Similarly, a device can detect data associated with a gesture, which may be referred to herein as device data. Accessory data and/or device data can be any type of data associated with a gesture or series of interactions, such as, for example, time information, pressure data, resistance data, accelerometer data, emitter data, camera data, and the like. The measurements may be made via pressure sensors, accelerometers, an LED or emitter, a camera, or other instruments associated with the accessory or device. The accessory data and the device data may further be associated with a number, a color, or a pattern communicated or received by an instrument associated with the accessory or the device (e.g., a color of light or a signal representing a number emitted from the accessory and detected by the device).

Identification component 122 identifies the accessory attempting to pair with a device. The accessory may be advertising a Bluetooth service indicating it is attempting to pair with a device. For example, when the accessory performs the gesture, it advertises a Bluetooth service, such as the communication class shared-secret-pairing, in association with the gesture indicating to devices within Bluetooth range that the accessory is attempting to pair with a device. Upon obtaining device data indicating a gesture has been performed, devices within range may scan for accessories advertising a Bluetooth service indicating those accessories are attempting to pair with a device. This enables the device to identify accessories within Bluetooth range attempting to pair with a device. Once an accessory is identified, the device connects to the accessory in an attempt to determine the accessory that performed a gesture matching the gesture the device received. Such a determination can be made by comparing the accessory data corresponding to a gesture the particular accessory performed with the device data corresponding to the gesture the device obtained, as described herein.

Comparison component 124 is generally configured to compare device data associated with a gesture detected by a device to accessory data associated with a gesture detected by an accessory. As such, the comparison component 124 receives, or otherwise obtains accessory data from one of the one or more accessories. The accessory data corresponds to a gesture performed in association with that particular accessory. For example, if the accessory is moved in a certain manner, accelerometer data may be included in the accessory data. Similarly, if the accessory taps the touch screen of a device a particular number of times, with a particular amount of pressure, or for a particular amount of time, that data is measured by the various instruments on the accessory and is included in the accessory data. Device data corresponding to a gesture detected by the device can comprise similar information measured by the various instruments on the device.

Comparison component 124 compares the accessory data to the device data to determine if there is a match or otherwise indicates that the gesture made by that particular accessory is the same gesture detected at the device. A match may include a match with a particular threshold, an exact match of the data, similar data in opposite directions, or data that otherwise indicates the accessory and the device are detecting the same gesture. If the accessory data matches the device data, the device data may be communicated from the device to the accessory. The device data provides another layer of security to the accessory, allowing the accessory to confirm the device actually detected the gesture performed by the accessory and is not a rogue device attempting to pair with the accessory. In other words, the device data enables the accessory to confirm it is pairing with the device it intended to pair with and a secure connection between the accessory and the device is established. In some instances, a secure connection may be established without the device data being communicated to the accessory. The secure connection results from the accessory successfully pairing with the device. The accessory data and the device data detected in accordance with the gesture are the shared secret or link key stored by the accessory and device, respectively, allowing the accessory and the device to be paired via Bluetooth. This also enables data exchanged between the accessory and the device to be encrypted.

Synchronization component 126 synchronizes an accessory clock associated with the accessory with a device clock associated with the device. Clocks between the stylus and the device may be synchronized by calculating a precise clock offset based on the accessory data and the device data. The accessory data and the device data may include time data associated with the gesture. When an accessory performs a gesture, both the accessory and the device may be equipped with various instruments (e.g., pressure sensors, accelerometers, emitters, cameras, and the like) that create or identify signals in accordance with the gesture. These signals may be identified, for example, via the various instruments associated with the accessory or device. The values of time associated with each interaction associated with the gesture may be included in the accessory data and the device data, as described above, and may further allow the accessory and the device to synchronize their clocks even in the absence of a real-time clock.

For example, when the accessory performs a gesture, the sensors on both the accessory and the device receive time data associated with various movements associated with the gesture. The time data associated with the various movements, such as accelerometer data indicating the accessory tapped the device and then raised the device and/or pressure sensor data received by the device associated with the accessory tapping the device and then raising the device allow a precise clock offset to be calculated by comparing each time the accessory tapped the device and the time the device detected each tap. This allows the stylus and the device to synchronize their clocks without a real-time clock. Such time synchronization provides increased security of the gesture. Additionally, by providing explicit time alignment between the accessory and the device, the reliability of gestures and touch-distinction, as well as contact-identification, is greatly improved by eliminating communications latency.

Release component 128 releases the accessory from the device. For example, if it is determined the device data does not match the accessory data, the accessory may be released and the device may continue the process of comparing accessory data to the device data with other accessories within range. Similarly, if the gesture component 120 or the device determines the accessory is attempting to pair with a new device, the release component 128 may release the accessory to the new device without requiring a user associated with the accessory or device to perform any unpairing actions. For example, if the gesture component 120 or the device detects an indication the accessory is performing the gesture but the device does not receive device data (e.g., accelerometer, pressure, LED signals, and the like) indicating the gesture is being performed to the device, the release component 128 automatically releases the accessory so the accessory can connect to the new device. If it is determined the accessory has not paired with the new device after a preconfigured amount of time, the device may automatically reconnect with the accessory without requiring any additional information from the accessory.

Release component 128 may determine the new device is able to communicate with the device (such as by being on the same network with the device). This may facilitate communication between the new device the accessory is attempting to pair with and the device. Such communication may enable coordination of an exchange of knowledge of the accessory between the new device and the device. The knowledge may include the accessory data, enabling the accessory to more quickly pair with the new device. The knowledge may further include clock synchronization information, allowing the accessory to synchronize its clock with the new device, even when a precise clock offset may not be calculated (e.g., such as may be the case if an LED signal is used to pair with the new device).

Figure 2:
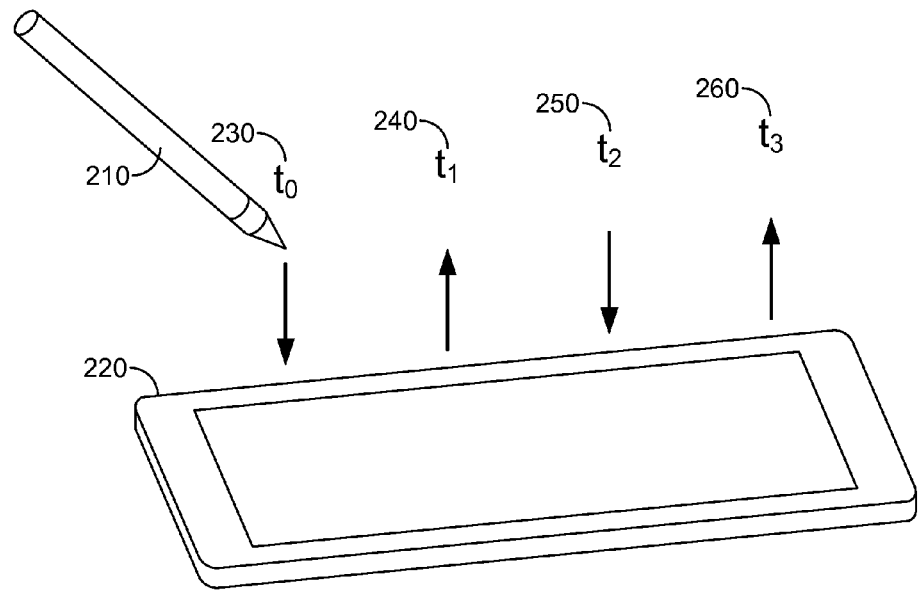
FIG. 2 is an exemplary diagram of time synchronization between an accessory and a device in accordance with an embodiment of the present invention.

An exemplary diagram of time synchronization between an accessory and a device is shown in FIG. 2. As can be seen in FIG. 2, an accessory is interacting, or performing a gesture, with a device 220. As a user utilizes the accessory to perform the gesture, such as with a series of taps on the device 220, the time associated with each tap is observed by both the accessory and the device. For example, the accessory initially makes contact or taps the device 220 at time $t_0$ 230. As the user raises the accessory 210 from the device 220, the accessory 210 ceases to exert pressure on the device 220 at time $t_1$ 240. An accelerometer or pressure sensor in the accessory 210 and a pressure sensor in the device 220 may receive data or signals corresponding to each of these times corresponding to the first tap. Similarly, a second tap may be observed by both the accessory and the device when various sensors in the accessory 210 and the device 220 receive signals at times $t_2$ 250 and $t_3$ 260. Many devices commonly record touch information as often as sixty times a second so the timing information corresponding to each time $t_0$ 230, $t_1$ 240, $t_2$ 250, $t_3$ 260 may be very fine-grained. Once data from the various sensors associated with the accessory 210 and the device 220 is received, a precise clock offset can be calculated allowing the accessory 210 to synchronize its clock with the device clock without requiring a real-time clock.

Figure 3:
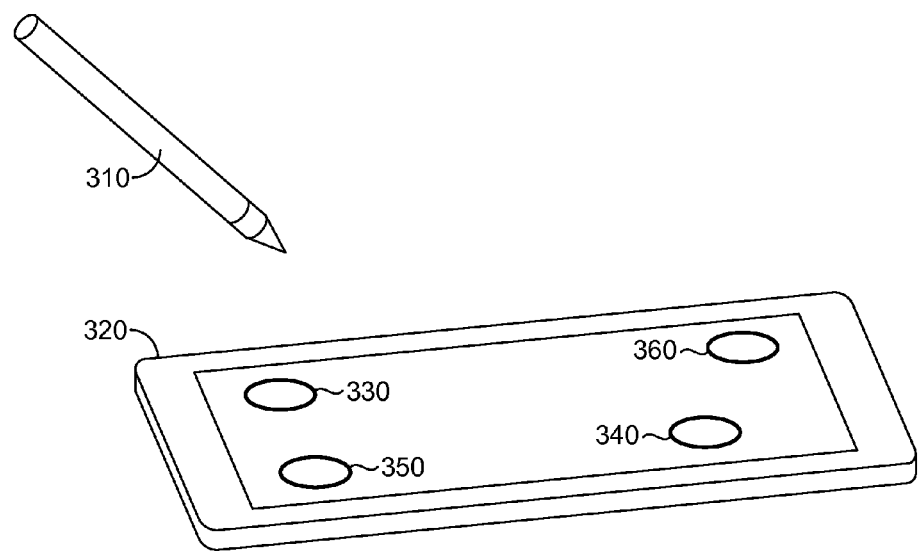
FIG. 3 is an exemplary diagram of a gesture pattern in accordance with an embodiment of the present invention.

In FIG. 3, an exemplary diagram of a gesture pattern is provided. As can be seen in FIG. 3, an accessory 310, such as a stylus, is being utilized to perform a gesture in association with a device 320. The gesture may include a gesture pattern that can be summarized by the accessory data and the device data. The gesture pattern may include a particular order of interactions between the accessory 310 and the device 320. Similarly, the gesture pattern may include particular movement by the accessory 310 or locations on the device 320 the accessory interacts with. Similarly, the gesture pattern may include a particular time associated with each interaction between the accessory 310 and the device 320. For example, the gesture pattern may be a series of presses in locations 330, 340, 350, 360, in that order, on the device. Similarly, the gesture pattern may be that the accessory 310 presses the device 320 in each corner of the display area of the device 320 in clockwise fashion. The gesture pattern may be that the accessory 310 presses the device 320 at each location 330, 340, 350, 360 for a particular amount of time. As can be appreciated, any type of gesture pattern may be configured between the accessory 310 and the device 320 for customization or increased security.

Figures 4, 5:
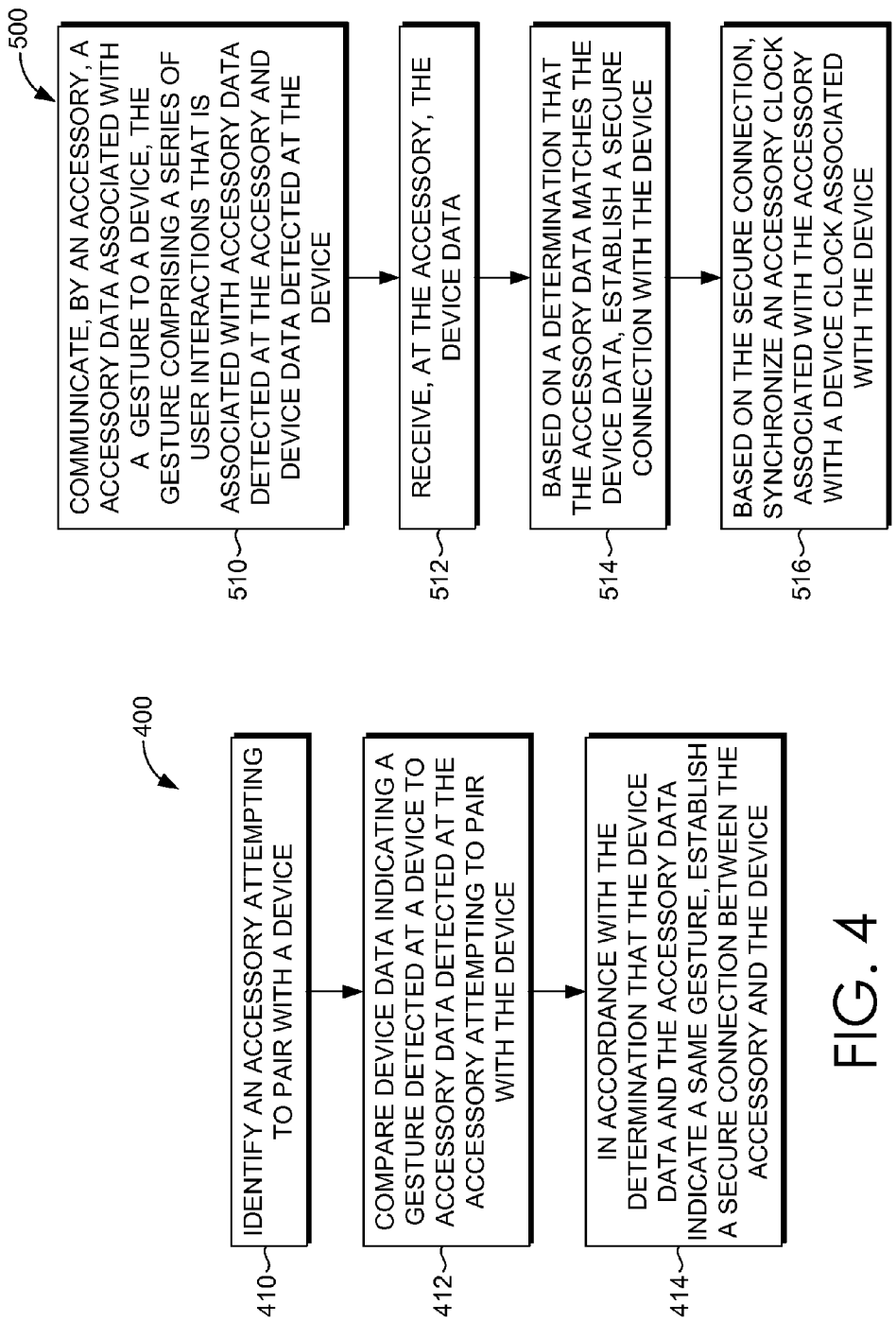
FIG. 4 is a flow diagram showing a method for pairing with an accessory in accordance with an embodiment of the present invention.
FIG. 5 is a flow diagram showing a method for pairing with a device in accordance with an embodiment of the present invention.

Referring now to FIG. 4, a flow diagram is provided that illustrates a method 400 for pairing with an accessory in accordance with an embodiment of the present invention. The method 400 may be performed, for instance, by the pairing system 100 of FIG. 1. As shown at step 410, an accessory attempting to pair with a device is identified. The accessory may be advertising a Bluetooth service indicating it is attempting to pair with a device. For example, when the accessory performs a gesture, it may advertise a standard Bluetooth service, such as the communication class shared-secret-pairing, in association with the gesture indicating to devices within Bluetooth range that the accessory is attempting to pair with a device. Upon receipt of device data indicating a gesture has been performed, devices within range may scan for accessories advertising this Bluetooth service indicating those accessories are attempting to pair with a device. This enables the device to identify accessories within Bluetooth range attempting to pair with a device.

As described above, the gesture may comprise any series of user interactions interpreted as having meaning. For example, the gesture may include a long tap, a series of taps, a pattern of taps, a signal, and the like. In another example, the gesture may include communicating a signal, such as via an LED or emitter associated with the accessory. Based on performance of the gesture, data indicating or otherwise associated with the gesture may be detected. In this regard, an accessory may detect accessory data associated with a gesture. Similarly, a device may detect device data associated with a gesture. Accessory data and/or device data can be any type of data associated with a gesture or series of interactions, such as, for example, time information, pressure data, resistance data, accelerometer data, emitter data, camera data, and the like. The measurements may be made via pressure sensors, accelerometers, an LED or emitter, a camera, or other instruments associated with the accessory or device. The accessory data and the device data may further be associated with a number, a color, or a pattern communicated or received by an instrument associated with the accessory or the device.

Once an accessory is identified, the device connects to the accessory in an attempt to determine the accessory that performed a gesture matching the gesture the device received. Such a determination can be made, at step 412, by comparing device data detected at the device to accessory data detected at the accessory attempting to pair with the device. In this regard, the accessory data corresponds to a gesture performed in association with that particular accessory. For example, if the accessory is moved in a certain manner, accelerometer data may be included in the accessory data. Similarly, if the accessory taps the touch screen of a device a particular number of times, with a particular amount of pressure, or for a particular amount of time, that data is measured by the various instruments on the accessory and is included in the accessory data. Device data corresponding to a gesture detected by the device comprises similar information measured by the various instruments on the device.

Each of the accessory data and the device data may represent a unique and precise summary of the data generated by the accessory while performing the gesture (e.g., measurements made in association with the gesture by the accessory or the device). In the case of multiple accessories connected to the same device, the accessory data and the device data may further be utilized to help the device understand which accessory is interacting with the device at any given time.

If the accessory data matches the device data or otherwise indicates that the gesture made by that particular accessory is the same gesture detected at the device, a secure connection between the accessory and the device is established, at step 414. In embodiments, a match may include a match with a particular threshold, an exact match of the data, similar data in opposite directions, or data that otherwise indicates the accessory and the device detected the same gesture.

In an embodiment, when the accessory data matches the device data, the device data is communicated from the device to the accessory. The device data provides another layer of security to the accessory, allowing the accessory to confirm the device actually detected the gesture performed by the accessory and is not a rogue device attempting to pair with the accessory. More simply, the device data enables the accessory to confirm it is pairing with the device it intended to pair with and a secure connection between the accessory and the device is established.

In an embodiment, the device data and the accessory data may further enable an accessory clock associated with the accessory to synchronize with a device clock associated with the device. This synchronization process may occur without utilizing a real-time clock by calculating a precise clock offset between measurements associated with the device data and the accessory data. For example, each of the accessory data and the device data may include time data that establishes various times when each of the series of interactions comprising the detected gesture occurred. These times may be compared allowing the accessory and the device to calculate the precise clock offset that may be utilized to synchronize the respective clocks. By providing explicit time alignment between the accessory and the device, the reliability of gestures and touch-distinction, as well as contact-identification, is greatly improved by eliminating communications latency.

In an embodiment, when the device determines the accessory is attempting to pair with a new device, the device may release the accessory to the new device without requiring a user associated with the accessory or device to perform any unpairing actions. For example, the device may receive an indication the accessory is performing the gesture but does not receive any device data indicating the gesture is being performed to or for the device. In this instance, the device automatically releases the accessory so the accessory can connect to the new device. If it is determined the accessory has not paired with the new device after a preconfigured amount of time, the device may automatically reconnect with the accessory without requiring any additional information from the accessory.

Communications between the new device the accessory is attempting to pair with and the device may be coordinated, which may enable coordination of an exchange of knowledge of the accessory between the new device and the device. The knowledge may include the gesture, because the gesture is the shared secret that allows Bluetooth pairing, enabling the accessory to more quickly pair with the new device. The knowledge may further include clock synchronization information, allowing the accessory to synchronize its clock with the new device, even when a precise clock offset may not be calculated.

Turning to FIG. 5, a flow diagram is provided that illustrates a method 500 for pairing with a device in accordance with an embodiment of the present invention. The method 500 may be performed, for instance, by the pairing system 100 of FIG. 1. As shown at step 510, accessory data associated with a gesture is communicated, by an accessory, to a device. The accessory may include a Bluetooth LE device, such as a stylus. The gesture may comprise any series of one or more user interactions interpreted as having meaning. For example, the gesture may include a long tap, a series of taps, a pattern of taps, a signal, and the like. In another example, the gesture may include communicating a signal, such as via an LED or emitter associated with the accessory. Based on performance of the gesture, data indicating or otherwise associated with the gesture may be detected. In this regard, an accessory can detect data associated with a gesture, which may be referred to herein as accessory data. Similarly, a device can detect data associated with a gesture, which may be referred to herein as device data. Accessory data and/or device data can be any type of data associated with a gesture or series of interactions, such as, for example, time information, pressure data, resistance data, accelerometer data, emitter data, camera data, and the like. The measurements may be made via pressure sensors, accelerometers, an LED or emitter, a camera, or other instruments associated with the accessory or device. The accessory data and the device data may further be associated with a number, a color, or a pattern communicated or received by an instrument associated with the accessory or the device.

The accessory receives or otherwise obtains, from the device, the device data, at step 512. If the accessory data does not match the device data, the accessory immediately releases and disconnects from the device, allowing the accessory to repeat with other devices in range. If the accessory data matches the device data, a secure connection with the device is established, at step 514. A match may include a match with a particular threshold, an exact match of the data, similar data in opposite directions, or data that otherwise indicates the accessory and the device are detecting the same gesture. The device data allows the accessory to confirm that the device is not attempting a nefarious connection attempt by verifying that the device actually detected the device data corresponding to the gesture performed by the accessory. In other words, the device data enables the accessory to confirm it is pairing with the device it intended to pair with and the secure connection between the accessory and the device is established. The accessory data and the device data may be encrypted with a common key. In an embodiment, a secure connection may be established without receiving the device data. In this instance, confirmation of the gesture may be made by the device by comparing the device data to accessory data that is received from the accessory.

Once the secure connection is established, an accessory clock associated with the accessory synchronizes, at step 516, with a device clock associated with the device. This synchronization process may occur without utilizing a real-time clock because each of the accessory data and the device data includes time data associated with each of the series of interactions corresponding to the gesture. When an accessory performs a gesture, both the accessory and the device may be equipped with various instruments (e.g., pressure sensors, accelerometers, emitters, cameras, and the like) that create or identify signals in accordance with the gesture. These signals may be identified, for example, via the various instruments associated with the accessory or device. The values of time associated with each interaction associated with the gesture may be included in the accessory data and the device data, as described above, and may further allow the accessory and the device to synchronize their clocks even in the absence of a real-time clock.

For example, when the accessory performs a gesture, the sensors on both the accessory and the device receive time data associated with various movements associated with the gesture. The time data associated with the various movements, such as accelerometer data indicating the accessory tapped the device and then raised the device and/or pressure sensor data received by the device associated with the accessory tapping the device and then raising the device allow a precise clock offset to be calculated by comparing each time the accessory tapped the device and the time the device detected each tap. This allows the stylus and the device to synchronize their clocks without a real-time clock. Such time synchronization provides increased security of the gesture. Additionally, by providing explicit time alignment between the accessory and the device, the reliability of gestures and touch-distinction, as well as contact-identification, is greatly improved by eliminating communications latency.

Figure 6:
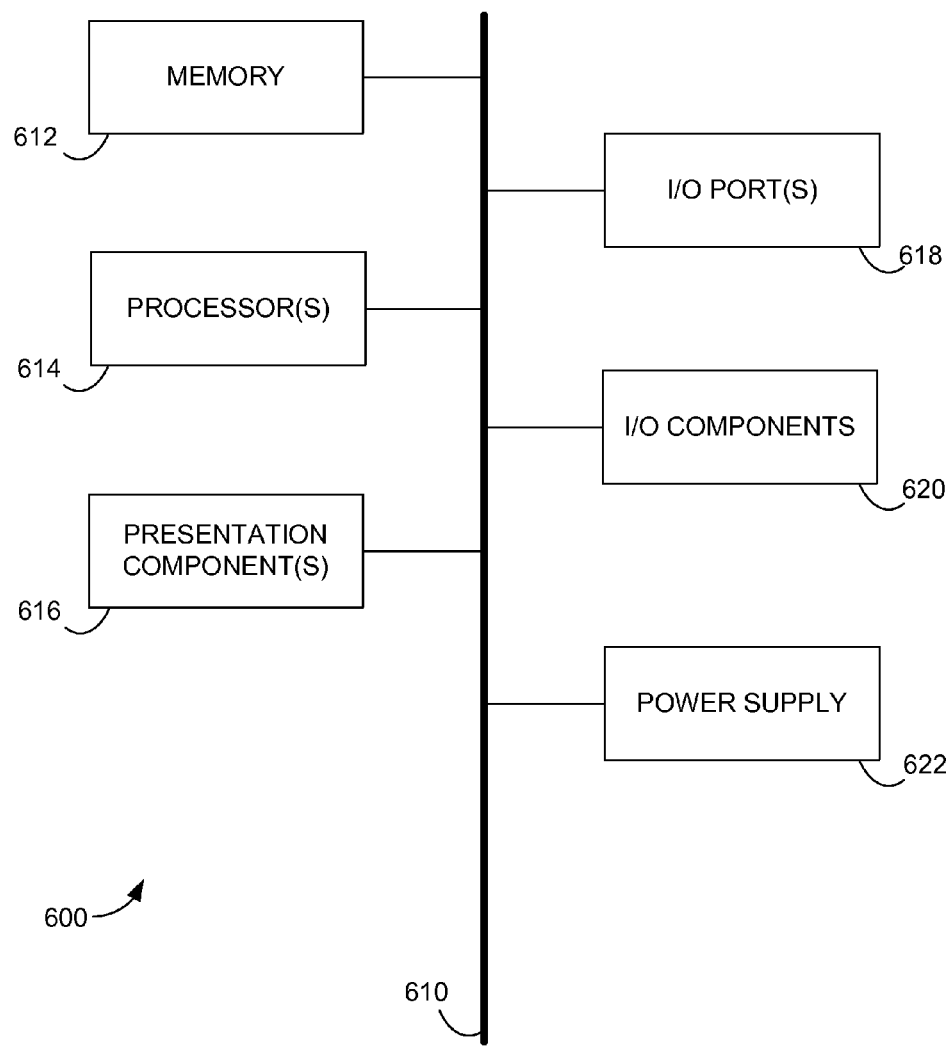
FIG. 6 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, embodiments of the present invention provide for an objective approach for determining the visual differences between images. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage medium comprising computer-useable instructions that, when used by one or more computing devices, cause the one or more computing devices to perform operations comprising:
   identifying an accessory connected with a device via a wireless connection;
   receiving accessory data detected at the accessory, the accessory data including one or more measurements of a gesture detected at the accessory and first time data based on an accessory clock associated with the accessory;
   comparing device data indicating a gesture detected at the device to the accessory data detected at the accessory, the device data including second time data based on a device clock associated with the device;
   in accordance with a first determination that the device data and the accessory data indicate a same gesture based on the one or more measurements, establishing a secure connection between the accessory and the device and synchronizing the accessory clock with the device clock based on an offset between the first time data and the second time data; and
   in accordance with a second determination that the device data and the accessory data indicate different gestures, releasing the accessory from the wireless connection.

2. The non-transitory computer storage medium of claim 1, further comprising:
   in response to receiving another accessory data associated with another gesture detected at the accessory via the secure connection without receiving another device data associated with another gesture detected at the device, releasing the accessory from the secure connection.

3. The non-transitory computer storage medium of claim 1, identifying the accessory comprises identifying accessories within Bluetooth range advertising a Bluetooth service indicating the accessory is attempting to pair.

4. The non-transitory computer storage medium of claim 1, further comprising synchronizing, based on respective time data associated with the same gesture at the accessory and the device, an accessory clock associated with the accessory with a device clock associated with the device.

5. The non-transitory computer storage medium of claim 4, wherein synchronizing comprises calculating a clock offset between the accessory clock and the device clock, and synchronizing the accessory clock and the device clock based on the clock offset.

6. The non-transitory computer storage medium of claim 1, further comprising determining the accessory is attempting to pair with a new device.

7. The non-transitory computer storage medium of claim 6, further comprising releasing the accessory to a new device without requiring unpairing actions.

8. The non-transitory computer storage medium of claim 6, further comprising determining the accessory has not paired with the new device after a preconfigured amount of time.

9. The non-transitory computer storage medium of claim 8, further comprising, reconnecting with the accessory without requiring any additional information from the accessory.

10. The non-transitory computer storage medium of claim 6, further comprising determining the new device is able to communicate with the device.

11. The non-transitory computer storage medium of claim 6, further comprising coordinating an exchange of knowledge of the accessory with the new device, the knowledge including the accessory data.

12. A computer-implemented method comprising:
communicating, by an accessory, accessory data associated with a gesture to a device, the gesture comprising one or more user interactions detected at the accessory, the accessory data including first time data based on an accessory clock;
receiving, at the accessory, device data detected at the device, the device data including second time data based on a device clock;
based on a determination, at the accessory, that the accessory data matches the device data, establishing a secure connection with the device; and
synchronizing the accessory clock associated with the accessory with the device clock associated with the device based on an offset between the first time data and the second time data.

13. The method of claim 12, wherein synchronizing the accessory clock with the device clock comprises calculating the offset between the accessory clock and the device clock.

14. The method of claim 12, wherein the accessory clock is not a real-time clock.

15. The method of claim 12, wherein the gesture is associated with at least one of pressure, accelerometer data, a signal from the accessory, or an additional data channel separate from the accessory.

16. A computerized system comprising:
one or more processors; and
one or more computer storage media storing computer-useable instructions that, when used by the one or more processors, cause the one or more processors to:
receiving accessory data detected by the accessory related to a first gesture and device data detected by a device related to a second gesture, wherein the accessory data comprises first time data associated with the first gesture based on an accessory clock, and the device data comprises second time data associated with the second gesture based on a device clock;
compare the accessory data to the device data to determine if the accessory data matches the device data;
based on at least one measurement of the first gesture in the accessory data matching a corresponding measurement of the second gesture in the device data, establish a secure connection between the accessory and the device; and
synchronize the accessory clock associated with the accessory with the device clock associated with the device based on an offset between the first time data associated with the first gesture and the second time data associated with the second gesture.

17. The system of claim 16, wherein the instructions further cause the one or more processors to compare more than two data points of time in the accessory data to respective data points of time in the device data to determine if the accessory data matches the device data.

18. The system of claim 16, wherein the instructions further cause the one or more processors to detect more than two interactions in a predetermined order between the accessory and the device, and include information of the more than two interactions in the predetermined order in the accessory data.

19. The system of claim 16, wherein the instructions further cause the one or more processors to detect a plurality of interactions between the accessory and the device associated with a plurality of predetermined locations on the device.

* * * * *